(12) United States Patent
Odland et al.

(10) Patent No.: US 6,302,951 B1
(45) Date of Patent: Oct. 16, 2001

(54) COATING COMPOSITION FOR REJUVENATING GLOSS OF PAINTED SURFACES

(76) Inventors: Lynn B. Odland; Marilyn K. Odland, both of 40546 253rd St., Mitchell, SD (US) 57301

( * ) Notice: Subject to any disclaimer, the term of this patent is extended or adjusted under 35 U.S.C. 154(b) by 0 days.

(21) Appl. No.: 09/477,411

(22) Filed: Jan. 4, 2000

(51) Int. Cl.$^7$ ........................................................ C09D 4/06
(52) U.S. Cl. .................... 106/264; 523/455; 525/113; 525/122; 525/332.1; 525/530
(58) Field of Search ................................ 106/14.22, 264; 523/400, 434, 436, 455, 458; 525/113, 122, 332.1, 530

(56) References Cited

U.S. PATENT DOCUMENTS

| | | |
|---|---|---|
| 3,124,475 | 3/1964 | Fischer et al. . |
| 3,901,837 | 8/1975 | Gottesman et al. . |
| 4,639,327 | 1/1987 | McGaha . |
| 4,699,807 | 10/1987 | Howell . |
| 5,064,688 | 11/1991 | Trifon . |
| 5,288,805 | 2/1994 | Kodali . |
| 5,320,670 | 6/1994 | Foster et al. . |
| 5,565,516 | 10/1996 | Fausnight et al. . |
| 5,587,007 | 12/1996 | Curvin . |
| 5,693,715 | 12/1997 | Kodali . |
| 5,834,054 | 11/1998 | Berry . |

Primary Examiner—Robert Dawson
Assistant Examiner—D. Aylward
(74) Attorney, Agent, or Firm—Richard C. Litman

(57) ABSTRACT

A paint protecting and reactivating composition comprising a main ingredient selected from: a dicyclopentadiene polymer, soy oil, sunflower oil or corn oil; an organic solvent; alkanoates of cobalt, magnesium, and zirconium; a chelating agent; an epoxy resin; a hindered amine; and a nitrogen heterocyclic compound.

8 Claims, No Drawings

COATING COMPOSITION FOR REJUVENATING GLOSS OF PAINTED SURFACES

BACKGROUND OF THE INVENTION

1. Field of the Invention

The present invention relates to a pigmentless coating composition for, rejuvenating the gloss of painted surfaces.

2. Description of the Related Art

There is a need for an economical, effective coating for rejuvenating and protecting oil base, enamel painted or baked enamel coatings. The relevant art of interest describes various paint coating compositions, but none discloses the present invention.

The related art will be discussed in the order of perceived relevance to the present invention.

U.S. Pat. No. 4,639,327 issued on Jan. 27, 1987, to Larry E. McGaha describes a composition for cleaning painted surfaces comprising 10–90 parts of either linseed oil, tung oil or sunflower oil, 10–90 parts of either methanol, ethanol or isopropyl alcohol, 1–5 parts of either acetic acid, lemon juice or vinegar, and 1–10 parts of a drying agent such as a "Japan Dryer". The cleaner composition is distinguishable for its inclusion of acetic acid, lemon juice or vinegar with the lower alcohols.

U.S. Pat. No. 5,693,715 issued on Dec. 2, 1997, and U.S. Pat. No. 5,288,805 issued on Feb. 22, 1994, to Dharma R. Kodali describes a vehicle composition and the method of making same comprising a copolymer of 70–95 wt. % linseed oil and 5–30 wt. % dicyclopentadiene. A second oil modified urethan polymer containing a drying oil selected from the group of tung oil, linseed oil, dehydrated castor oil, safflower oil, soya oil, canola oil, rapeseed oil, cottonseed oil, sunflower oil, and mixtures thereof. The vehicle compositions are distinguishable for being limited to a vehicle composition for liquid coating compositions.

U.S. Pat. No. 3,901,837 issued on Aug. 21, 1975, to Roy T. Gottesman et al. describes the addition of 2–5% metal salt solutions as loss-of-dry additives to paints, varnishes, enamels, printing inks, and the like. The vehicle can be linseed oil, soybean oil, tung oil, dehydrated castor oil, an alkyd resin, or an oleoresinous varnish. Pigments, extenders, solvents, plasticizers, and anti-skinning agents can be added. The metal salt solution contains 0.05–1.5 wt. % cobalt, 0.5–3.5 wt. % calcium, and 0.5–5.0 wt. % zinc or zirconium as salts of organic acids which are either branched-chain aliphatic monocarboxylic acids having 6–14 carbon atoms, cycloaliphatic monocarboxylic acids having 6–10 carbon atoms or mixtures thereof. The drier compositions are distinguishable for including calcium salts, pigments, extenders, plasticizers and anti-skinning agents.

U.S. Pat. No. 5,064,688 issued on Nov. 12, 1991, to George Trifon describes a composition and a process for restoring an automotive polymeric top coat which has become pitted. A silanic hydrogen containing silicone compound is diluted by either mineral spirits, 1,1,1 trichloroethane, D-limonene or kerosene, adding a catalyst selected from the group consisting of isopropanol titinate, tin oxalate, and zirconium acetate, and applied by either cloth, brush or sprayer. The clear composition is distinguishable for utilizing a silicone base devoid of oils and with titanium and tin containing organic catalysts.

U.S. Pat. No. 4,699,807 issued on Oct. 13, 1987, to John S. Howell describes a finish restoring composition containing 3–6% triethanolamine, 5–8% potassium silicate, 0.4–2.0% lecithin in water, and 7–30% linseed oil. Broken, crazed or alligatored finishes are restored without removing the original coating by rubbing the composition in with a dry cloth, fine steel wool or sandpaper. The composition must then be promptly removed to avoid damage to the original coating. The composition is distinguishable for its silicate and lecithin components.

U.S. Pat. No. 3,124,475 issued on Mar. 10, 1964, to Alfred Fischer et al. describes a 0.01–1 wt. % metal salt drier composition containing a mixture of isomeric trimethylheptanoic acids and the sulfates or nitrates of lead, cobalt, manganese, calcium, and zinc with lead preferred. The drier composition is added to paints, varnishes enamels, printing inks, and linoleum print paints. The drier compositions are distinguishable for their limitation to exclude isomeric solvents having a methyl substituent in the 2-position.

U.S. Pat. No. 5,320,670 issued on Jun. 14, 1994, to Avis A. Foster et al. describes a soybean oil paint base and colorant blend composition comprising 65–75% soybean oil, 1.5–1.7% dryers (japan, oxides of manganese, cobalt, zirconium, carboxylate, calcium, and mineral spirits), 1.5–1.75% antioxidant (butyl-P-cresol and butylated hydroxytoluene), 5–20% pigments or dyes (Napthol Red, Aylide Yellow, Carbazole Violet, Phthlocyanine Blue, Quinacridone, Azo Yellow, Napthol Red Light, Ultramarine, Burnt Umber, Burnt Sienna, Raw Umber, and Raw Sienna), and 6.9–7.5% fillers such as silica. Boiled linseed oil in the amount of 4–10% was further added. The bioreducible paint composition is distinguishable for including pigments and silica.

U.S. Pat. No. 5,565,516 issued on Oct. 15, 1996, to Ronald L. Fausnight et al. describes a finishing composition for restoring aged automobile painted coatings comprising by weight per cent, 62.5% mineral spirits, 4% isoparaffinic solvent, 33% isobutyl methacrylate acrylic resin, 0.1% hydroxyl-functional silicone glycol surfactant, 0.1% carbinol-functional silicone glycol surfactant, 0.1% polyester modified siloxane, 0.03% amino-functional polydimethylsiloxane copolymer cross-linking agent, and 0.17% amino-functional polydimethylsiloxane copolymer cross-linking agent. The paint composition is distinguishable for including silicones and cross-linking additives for a methacrylate acrylic resin.

U.S. Pat. No. 5,587,007 issued on Dec. 24, 1996, to Daniel R. Curvin describes phenol modified dicyclopentadiene resins for use in ink vehicles. The modified resins are distinguishable for their limited use in inks.

U.S. Pat. No. 5,834,054 issued on Nov. 10, 1998, to Bradford E. Berry describes a method for restoring an automotive paint finish comprising cleaning the recesses, coating with linseed oil or mineral oil from a cloth pad, applying wet color-matched touch-up paint (urethane base) to the recesses, blading the surface, and drying. The method is distinguishable in repainting the scratches.

None of the above inventions and patents, taken either singularly or in combination, is seen to describe the instant invention as claimed. Thus, an oil-based paint protecting and reactivating composition devoid of pigments solving the aforementioned problems is desired.

SUMMARY OF THE INVENTION

Essentially, the present invention is a pigmentless coating composition for rejuvenating the gloss of a painted surface that has dulled over time. The present composition comprises as main ingredient a dicyclopentadine polymer, soy oil, sunflower oil or corn oil. Other components of the present invention include an organic solvent; alkanoates of cobalt, magnesium, and zirconium; a chelating agent; an epoxy resin; a hindered amine; and a nitrogen heterocyclic compound.

Accordingly, it is a principal object of the invention to provide a pigmentless coating composition for rejuvenating an oil-based paint coating such as baked enamel to restore its original lustre.

It is another object of the invention to provide a pigmentless composition for protecting and rejuvenating faded oil-based paint coatings containing a cyclopentadiol.

It is a further object of the invention to provide a pigmentless composition for protecting and rejuvenating faded oil-based paint coatings containing in addition either linseed oil, soy oil, corn oil or mixtures thereof.

Still another object of the invention is to provide a pigmentless composition for protecting and rejuvenating faded oil-based paint coatings containing in addition either zirconium, cobalt, manganese salts or mixtures thereof.

It is an object of the invention to provide improved elements and arrangements thereof for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENTS

The present invention is directed to a spray-on pigmentless composition for rejuvenating the gloss of the original painted enamel surface of vehicles, steel buildings, steel boats, fiberglass boats, railroad engines, and the like. The dulled and scratched surface can first be cleaned by rubbing the surface with a 5% aqueous solution containing a corn derivative additive and a fiber pad to eliminate any wax, grime, oxidation and vinyl lettering tracks. The brushed surface is rinsed off with water. After drying, any chipped areas can be touched up with color matching oil-based paint.

The rejuvenating composition is sprayed at a temperature at least 70° F. and at a pressure of 55–65 psi to provide a new lustre to the painted surface at an economical cost relative to a new paint coating.

The preferred chemicals and combining proportions will be given in gallons and milliliters for a batch of 83 gallons and the preferred ranges in volume per cent.

The main preferred component of the present composition is a 70% solution of dicyclopentadine polymer having the following specifications: acid value 4; Gardner color 11; viscosity 5–10.5 Stokes at 25° C.; iodine value, 115–130; saponification value 100–115; and 7.61 lbs./gal. Other substitutes can be soy oil, sunflower oil or corn oil in the same amount.

62.5 gallons of a solvent are then added. The solvent contains in volume per cent the following substances: at least 40% toluene; 9% acetone; 3% ethyl benzene; 12% mixed xylenes; and at least 96 propylene glycol monomethyl ether acetate.

There are four essential drier components required as follows: 600 ml. of 12% cobalt carboxylate; 300 ml. of 12% magnesium alkanoate; 8 liters of 12% of zirconium 2-ethylhexanoate; and 100 ml. of an organic chelating agent to retard the drying effects of cobalt and manganese.

13.6 ml. of a bisphenol A and epichlorohydrin based epoxy resin are added to each gallon of the composition.

15.0 ml. of a hindered amine, dodecyl-N-(2,2,6,6-tetramethyl-4-piperidinyl)-succinimide, is added to each gallon of the composition as an ultraviolet light stabilizer.

15.0 ml. of a nitrogen heterocyclic compound containing 31–35% xylene, is added to each gallon of the composition as an ultraviolet light stabilizer. The total volume becomes 82.75 gallons of material.

The composition has been coated on cleaned deteriorated paint coating a farm vehicle, a semi-tractor and colored steel buildings to rejuvenate the original coating to its original lustre.

The preferred ranges for each ingredient in a batch of 83 gallons are as follows:

dicyclopentadiene polymer solution, 15–21 gallons;

organic solvent, 60–65 gallons;

12% cobalt carboxylate, 400–800 ml;

12% magnesium alkanoate, 200–400 ml;

12% zirconium 2-ethylhexanoate, 7–9 liters;

chelating agent, 50–150 ml;

bisphenol A and epichlorohydrin based epoxy resin, 10–16 ml;

hindered amine, 10–20 ml; and nitrogen heterocyclic compound, 25–40%.

The gloss improvement with the present invention was demonstrated by cleaning and coating with the present invention on one-half of a selected surface portion of a 1984 vehicle which has been left outside in use and exposed to the sun and the cold weather for 15 years. The coated test surface and the original cleaned surface was tested for gloss readings by a Micro-TRI-gloss gloss meter made by BYK Gardner Co., Columbia, Md. The gloss values improved from 2.5 at a 20° angle and 30 at a 60° angle to 60 at 20° and 88 at 60°. In fact, the gloss value at 20° improved 24 fold. The gloss value at 60° improved 2.93 or almost 3 fold.

It is to be understood that the present invention is not limited to the embodiments described above, but encompasses any and all embodiments within the scope of the following claims.

We claim:

1. A coating composition for rejuvenating gloss of painted surfaces, said composition in an 83 gallon batch comprising:

15–21 gallons of a component selected from the group consisting of a solution of dicyclopentadiene polymer, soy oil, sunflower oil, and corn oil;

60–65 gallons of an organic solvent;

400–800 ml. of a 12% cobalt carboxylate solution in the organic solvent;

200–400 ml. of a 12% magnesium alkanoate solution in the organic solvent;

7–9 liters of a 12% zirconium 2-ethylhexanoate solution in the organic solvent;

50–150 ml. of a chelating agent;

10–16 ml. of a bisphenol A and epichlorohydrin based epoxy resin;

10–20 ml. of a hindered amine as a UV light stabilizer; and

10–20% of a nitrogen heterocyclic compound as a UV light stabilizer.

2. The coating composition according to claim 1, wherein said component is a solution of dicyclopentadiene polymer.

3. The coating composition according to claim 1, wherein said organic solvent contains at least 40% toluene, 9% acetone, 3% ethyl benzene, and at least 9% propylene glycol monomethyl ether acetate.

4. The coating composition according to claim 1, wherein said hindered amine is dodecyl-N-(2,2,6,6-tetramethyl-4-piperidinyl)succinimide.

5. A coating composition for rejuvenating gloss of painted surfaces, said composition in an 83 gallon batch comprising:

18 gallons of a component selected from the group consisting of a 70% solution of dicyclopentadiene polymer, soy oil, sunflower oil, and corn oil;

62.5 gallons of an organic solvent;

600 ml. of a 12% solution of cobalt carboxylate in the organic solvent;

200–400 ml. of a 12% solution of magnesium alkanoate in the organic solvent;

8 liters of a 12% solution of zirconium 2-ethylhexanoate in the organic solvent;

100 ml. of a chelating agent;

13.6 ml. of a bisphenol A and epichlorohydrin based epoxy resin;

15 ml. of a hindered amine as a UV light stabilizer; and 15 ml. of a nitrogen heterocyclic compound as a UV light stabilizer.

6. The coating composition according to claim 5, wherein said component is a solution of dicyclopentadiene polymer.

7. The coating composition according to claim 5, wherein said organic solvent contains at least 40% toluene, 9% acetone, 3% ethyl benzene, and at least 9% propylene glycol monomethyl ether acetate.

8. The coating composition according to claim 5, wherein said hindered amine is dodecyl-N-(2,2,6,6-tetramethyl-4-piperidinyl)succinimide.

* * * * *